(12) United States Patent
Glenn et al.

(10) Patent No.: US 7,516,573 B1
(45) Date of Patent: Apr. 14, 2009

(54) METHOD FOR REDUCING FREEZE AND CHILL DAMAGE IN PLANTS

(76) Inventors: David Michael Glenn, 1207 Glen Rd., Shepherdstown, WV (US) 25443; Richard C. Pluta, 16 Tumbling Brook Dr., Towaco, NJ (US) 07082; Gary J. Puterka, 4803 S. Longview Dr., Stillwater, OK (US) 74074; John T. Mosko, 141 Rector St., Perth Amboy, NJ (US) 08861; Peter S. Barrows, 2 Orchard Rd., Washington Crossing, PA (US) 18977

( * ) Notice: Subject to any disclaimer, the term of this patent is extended or adjusted under 35 U.S.C. 154(b) by 90 days.

(21) Appl. No.: 11/099,993

(22) Filed: Apr. 6, 2005

Related U.S. Application Data

(60) Provisional application No. 60/560,125, filed on Apr. 7, 2004.

(51) Int. Cl.
 *A01G 13/00* (2006.01)
(52) U.S. Cl. .................................. 47/58.1 FV
(58) Field of Classification Search .............. 47/58.1 R, 47/58.1 ILS, 58.1 SE, DIG. 11, 1.01 R, 2, 47/58.1 FV
 See application file for complete search history.

(56) References Cited

U.S. PATENT DOCUMENTS

| | | | |
|---|---|---|---|
| 4,432,160 A | 2/1984 | Lindow | 47/2 |
| 4,434,345 A | 2/1984 | Muscatell | 219/10.55 |
| 4,597,883 A | 7/1986 | Lengyel | 252/70 |
| 4,766,077 A | 8/1988 | Orser et al. | 435/253 |
| 5,133,891 A | 7/1992 | Barr et al. | 252/70 |
| 5,276,006 A | 1/1994 | Shin et al. | 504/140 |
| 5,618,330 A | 4/1997 | Artozon Sylvester | 71/32 |
| 5,633,450 A | 5/1997 | Suslow et al. | 800/205 |
| 5,653,054 A * | 8/1997 | Savignano et al. | 47/2 |
| 5,908,708 A * | 6/1999 | Sekutowski et al. | 428/541 |
| 6,060,521 A * | 5/2000 | Sekutowski et al. | 516/79 |
| 6,235,683 B1 * | 5/2001 | Glenn et al. | 504/119 |
| 6,464,995 B1 * | 10/2002 | Sekutowski et al. | 424/405 |
| 6,857,224 B1 * | 2/2005 | Kammereck et al. | 47/58.1 FV |
| 2004/0146617 A1 * | 7/2004 | Schrader | 426/335 |

\* cited by examiner

*Primary Examiner*—Francis T Palo
(74) *Attorney, Agent, or Firm*—Hayden Stone PLLC; Christopher G. Hayden

(57) ABSTRACT

Disclosed are methods for blocking radiation to horticultural crops in order to reduce light-induced freeze and chill damage which involve treating the surface of the horticultural crops with an effective amount of one or more particulate materials.

22 Claims, 1 Drawing Sheet

METHOD FOR REDUCING FREEZE AND CHILL DAMAGE IN PLANTS

This application claims priority to Provisional Application U.S. 60/560,125 filed Apr. 7, 2004.

FIELD OF THE INVENTION

The present invention generally relates to methods for reducing the deleterious effects of light on plants following freeze and chill events to prevent plant damage.

BACKGROUND OF THE INVENTION

Freezing and chilling injury in plants has been categorized into three distinct groups according to the threshold below which injury is observed. Chilling sensitive species of plants exhibit injury between 10° C. and 15° C. Chilling resistant but freeze sensitive species of plants exhibit damage from 0° C. to −10° C. Freeze tolerant species of plants are able to survive long periods of subzero temperatures via cold acclimation.

The existing technology to mitigate chill and freeze damage includes:

1) materials that change the freezing point of the plant tissue or water. Patents related to this technology include: Barr, et al U.S. Pat. No. 5,133,891 which relates to Treatment of plants for frost protection by the application of an organic chemical; Shin et al U.S. Pat. No. 5,276,006 which relates to a Cryoprotectant composition that increases the tissue resistance to freeze damage; Savignano et al U.S. Pat. No. 5,653,054 which relates to a Process for preventing frost formation on plants that lowers the freezing point of water; Lengyel U.S. Pat. No. 4,597,883 which relates to a Composition and method for minimizing frost damage to plants that uses a salt-based solution to lower the freezing point of water and resist cell damage to freezing temperature; Artozon U.S. Pat. No. 5,618,330 which relates to Plant treatment compositions and process that uses high concentrations of salts to protect against frost damage; and Suslow et al U.S. Pat. No. 5,633,450 which relates to Chitinase-producing plants that are resistant to cold damage.

2) reduce the populations of ice nucleating bacteria on the crop surface, thereby inhibiting ice formation on the crop surface. Patents related to this technology include: Lindow U.S. Pat. No. 4,432,160 which relates to microorganism inhibition of frost damage to plants which is a method describing the selection and use of ice nucleating deficient bacteria to prevent freezing damage; and Orser et al U.S. Pat. No. 4,766,077 which relates to Ice nucleation deficient microorganisms by genetic manipulation which is a method to produce ice nucleating deficient organisms to be applied to plants as a frost protectant.

3) delay dehardening. This technology does not directly prevent frost damage, but delays the development of frost-sensitive reproductive tissues in the early growing season so that frost does not occur when frost-sensitive tissues are exposed.

4) non-chemical approaches. Muscatell U.S. Pat. No. 4,434,345 which relates to a Microwave system for frost protection of fruit trees that generates heat to prevent freezing, and Donohue et al, which relates to a Method and apparatus for the protection of citrus trees from frost damage that is an insulating pad for the trunk of the tree. Wind machines that mix the air over a field and prevent inversion layers of freezing air at ground level are a common method of frost control. Burning material to generate heat and smoke to disrupt the inversion layer at ground level was used in the past but environmental concerns preclude its present day usage. The most common non-chemical strategy is to apply water to plant surfaces to utilize the heat of fusion and keep the plant temperature at or near freezing.

5) preventing ice nucleation. Wisniewski, M. and M. Fuller (Ice nucleation and deep supercooling: new insights using infrared thermography in: Cold Adapted Organisms: Fundamentals and Applications. Eds. R. Margesin and F. Schinner. Landes BioScience, Austin, Tex.) have shown that the application of a silicone grease to plant surfaces makes a water repellant film that prevents ice from propagating into the plant and allows the plant to supercool, thus preventing frost damage. However the application of silicon grease to plants is phytotoxic by also preventing the exchange of gases from the leaf. Glenn et al. U.S. Pat. No. 6,235,683 "Method for enhanced supercooling of plants to provide frost protection" is a method that prevents ice nucleation within the plant by coating the plant with a hydrophobic particle film that prevents water from contacting the plant surface and transferring ice nucleation into the plant.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The present invention provides methods of mitigating damage to plants caused by low temperatures and solar radiation. The results of the present invention are thus surprising since one may intuitively speculate that solar radiation contact after exposure to cold temperatures would provide welcomed heating.

One aspect of the invention relates to methods of preventing chill damage or freeze damage in a plant involving preventing a substantial amount of solar radiation from contacting the plant after temperatures are below about 15° C. or below about 0° C. by applying a particulate material film to the plant to block a substantial amount of the solar radiation. The particulate material film is applied before or while temperatures are below about 15° C. or below about 0° C.; however, the particulate material film is applied before the plant is exposed to solar radiation. Consequently, a substantial amount of solar radiation is blocked from the plant after the plant encounters temperatures below about 15° C. or below about 0° C. Another aspect of the invention relates to methods of reducing damage in a plant caused by exposure of the plant to temperatures of about 15° C. or less by reducing photoinhibition in the plant by blocking a substantial amount of solar radiation from the plant after temperatures fall below about 15° C., by the application of a particulate material film to the plant that blocks the solar radiation from the plant.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of

DETAILED DESCRIPTION OF THE INVENTION

Figure 1:
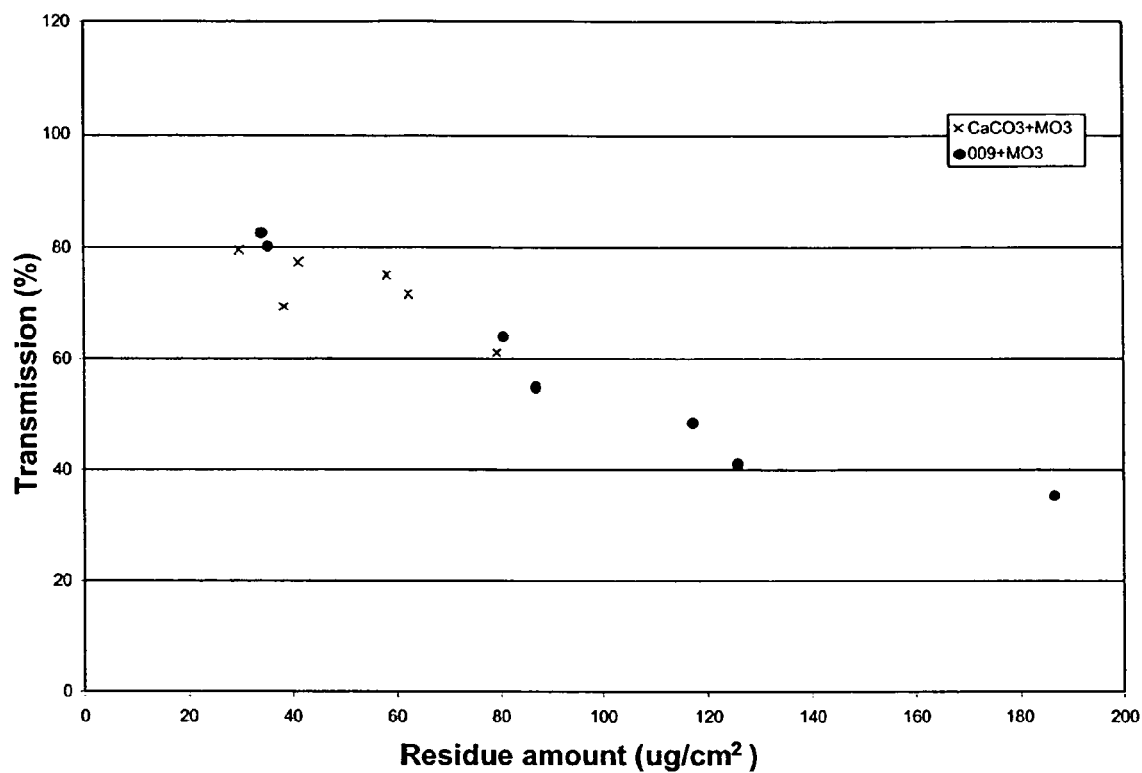
FIG. 1 shows a graph plotting the % transmission of visible light versus the amount of residue of numerous particulate material films on a glass plate.

When plants are exposed to high light intensity after chilling or freezing, the severity of damage is increased. Freezing and chilling conditions are often followed by clear sky conditions the following morning and are an important component of the plant's response. The deleterious effect of high light intensity is due to an excess of energy and an insufficient demand, or sink, for that energy within the plant. At low temperatures, energy flow to the photosynthetic system exceeds demand and results in excess excitation energy formed in the chloroplasts. Active oxygen species (such as $H_2O_2$) are formed from the excess energy and cause oxidative stress and molecular or membrane damage within the chloroplasts. Chloroplast damage can result in a range of response from decreased photosynthetic activity to cell death.

The present invention prevents and/or reduces freeze damage and chill damage in plants by blocking the exposure of plants to high light intensity after the plant encounters freezing or chilling temperatures. By blocking exposure to light, energy flow to the photosynthetic system does not exceed the demand and consequently the chloroplasts do not contain excess excitation energy. Exposure to light is achieved by applying a particulate material film to the plant, and specifically, to portions of the plant containing a relatively high concentration of chloroplasts.

High light intensity is solar radiation of sufficient energy to produce excess energy in the chloroplasts of plants that are contacted by the solar radiation. Solar radiation contains infrared light/radiation (IR), visible light/radiation, ultraviolet light/radiation (UV), and many other wavelengths of light/radiation.

Chill damage/injury of chill sensitive plants occurs when the plants are exposed to temperatures from about 15° C. to about 0° C. The damage is exacerbated by high light intensity during or following the chill event or exposure to chilling temperatures. Freeze damage/injury of frost sensitive plants occurs when the plants are exposed to temperatures below about 0° C. to about −10° C. The damage is exacerbated by high light intensity during or following the freeze event or exposure to freezing temperatures. Non-lethal damage/injury is damage/injury that does not result in complete death of the plant.

The invention involves a sprayable particulate material film that has a high reflection of UV, IR and visible radiation. That is, the invention involves sprayable films that block light from a plant to which they are applied following a chill or freeze event and reduce the photochemical input into the photosynthetic system. The particulate material film is not phytotoxic itself. The particulate material film may reduce plant growth in the short-term but the plant resumes normal growth within one-two weeks. The particulate material film can be sprayed the day before a freeze/chill event and be effective the following day. That is, the particulate material film can be applied to a plant before temperatures are below 15° C. or 0° C. or while temperatures are below 15° C. or 0° C. so long as the particulate material film is applied before solar radiation attempts to contact the plant. The particulate material film is effective the following day by blocking substantial amounts of UV, visible, and IR radiation from reaching the chloroplasts of plants and causing photoinhibition, free radical formation, and biochemical damage.

The particulate material film prevents a substantial amount of solar radiation from contacting the plant after temperatures are below 15° C. or 0° C. by blocking at least about 20% of solar radiation, and particularly at least about 20% of at least one of UV, visible, and IR solar radiation, from contacting the plant. When at least about 20% of solar radiation is blocked, the photochemical input into the photosynthetic system is sufficiently reduced so that excess energy in the chloroplasts of the treated plants is not generated. In another embodiment, the particulate material film prevents at least about 30% of solar radiation, and particularly at least about 30% of at least one of UV, visible, and IR solar radiation, form contacting portions of the plant containing a substantial amount of chloroplasts. In yet another embodiment, the particulate material film prevents at least about 40% of solar radiation, and particularly at least about 40% of at least one of UV, visible, and IR solar radiation, form contacting portions of the plant containing a substantial amount of chloroplasts. In still yet another embodiment, the particulate material film prevents at least about 50% of solar radiation, and particularly at least about 50% of at least one of UV, visible, and IR solar radiation, form contacting portions of the plant containing a substantial amount of chloroplasts.

The plants to which the particulate material film is applied include horticultural crops, actively growing and/or fruiting agricultural and ornamental crops and the products thereof. Agricultural crops are plants used to make useful products, such as food products, feed products, fiber products and the like. Ornamental crops are plants used for decoration or aesthetic reasons. Examples include fruits, vegetables, trees, flowers, grasses, roots, seeds, and landscape and ornamental plants. Specific examples include apple trees, pear treas, peach trees, plum trees, lemon trees, grapefruit trees, avocado trees, orange trees, apricot trees, walnut trees, pecan trees, raspberry plants, strawberry plants, blueberry plants, blackberry plants, bosenberry plants, corn, beans including soybeans, squash, tobacco, roses, violets, tulips, tomato plants, grape vines, pepper plants, potatoes plants, eggplants, wheat, barley, oats, rye, triticale, hops, alfalfa, medicinal herbs, straw, and many others.

The particulate materials useful for the purposes of this invention are hydrophobic and/or hydrophilic. The finely divided particulate materials useful for the purposes of this invention are hydrophobic and hydrophilic materials and the hydrophobic materials may be hydrophobic in and of themselves, e.g., mineral talc, or may be hydrophilic materials that are rendered hydrophobic by application of an outer coating of a suitable hydrophobic wetting agent (e.g., the particulate material has a hydrophilic core and a hydrophobic outer surface, or the particulate material has a hydrophobic core and a hydrophilic outer surface). In another embodiment, the particulate materials are hydrophilic in and of themselves (calcined kaolins).

The particulate material film contains at least one particulate material. Examples of the particulate material include aluminum trihydrate, barytes, calcined kaolin, calcium carbonate, precipitated calcium carbonate, calcium chloride, carbon black, chalk, clays, cryolite, diatomaceous earth, dolomite, feldspar, hydrous kaolin, metakaolin, beneficiated kaolin, iron oxide, hydrated lime, limestone, metakaolin, mica, talc, pyrophyllite, quartz, pyrogenic silica, silica, sand, and titanium dioxide. In one embodiment, the particulate material film contains at least two different particulate materials. In another embodiment, the particulate material film contains at least three different particulate materials.

In one embodiment, the particulate materials suitable for use in the present invention are heat treated particulate materials. For purposes of this invention, heat treated particulate materials are particulate materials that have been heated to an elevated temperature and include baked particulate materials, calcined particulate materials, and fired particulate materials. Heat treated particulate materials are generally hydrophilic. Specific examples include calcined calcium carbonate, calcined talc, calcined kaolin, baked kaolin, fired kaolin, hydrophobic treated heat treated kaolin, calcined bentonites, calcined clays, calcined pyrophyllite, calcined silica, calcined feldspar, calcined sand, calcined quartz, calcined chalk, calcined limestone, calcined precipitated calcium carbonate, baked calcium carbonate, calcined diatomaceous earth, calcined barytes, calcined aluminum trihydrate, calcined pyrogenic silica, and calcined titanium dioxide.

Heat treatment in accordance with the invention involves heating a particulate material at a temperature from about 300° C. to about 1,200° C. for about 10 seconds to about 24 hours. In another embodiment, heat treatment involves heating a particulate material at a temperature from about 400° C. to about 1,100° C. for about 1 minute to about 15 hours. In yet another embodiment, heat treatment involves heating a particulate material at a temperature from about 500° C. to about 1,000° C. for about 10 minutes to about 10 hours. The heat treatment may be carried out in air, in an inert atmosphere or under a vacuum.

In these embodiments, the particulate materials contain at least about 25% by weight, and particularly about 25% to about 100% by weight of heat treated particulate materials. In another embodiment, the particulate materials contain at least about 40% by weight, and particularly about 40% to about 99% by weight of heat treated particulate materials.

The surfaces of the particulate hydrophilic materials can be made hydrophobic by contact with at least one hydrophobic wetting agent and/or coupling agent. Industrial mineral applications, especially in organic systems such as plastic composites, films, organic coatings or rubbers, utilize hydrophobic surface treatments to render a mineral surface hydrophobic; see, for example, Jesse Edenbaum, Plastics Additives and Modifiers Handbook, Van Nostrand Reinhold, N.Y., 1992, pages 497-500 which is incorporated herein by reference for teachings of such hydrophobic surface treatment materials and their application.

Coupling agents such as fatty acids and silanes are commonly used to surface treat solid particles as fillers or additives targeted to these industries.

Such hydrophobic agents are known in the art. Examples include organic titanates such as Tilcom® from Tioxide Chemicals; organic zirconate or aluminate coupling agents from Kenrich Petrochemical, Inc.; organofunctional silanes such as vinyltriethoxysilane, vinyl tris-(2-methoxyethoxy) silane, gamma-methacryloxypropyltrimethoxysilane, β-(3, 4-epoxycyclohexyl)ethyltrimethoxysilane, gamma-glycidoxypropyltrimethoxysilane, gamma-mercaptopropyltrimethoxysilane, gamma-aminopropyltriethoxysilane, N-β-(aminoethyl)-gamma-aminopropyltrimethoxysilane, and β-mercaptoethyltriethoxysilane, and others under the trade designation Silquest® from Witco or those under the trade designation Prosil® from PCR; modified silicone fluids such as the DM-Fluids obtained from Shin Etsu; and fatty acids such as double pressed stearic acid and triple pressed stearic acid and others under the trade designation Hystrene® or Industrene® from Witco Corporation or those under the trade designation Emersol® from Henkel Corporation. In a specific embodiment, stearic acid and stearate salts are particularly effective for rendering a particle surface hydrophobic.

Further specific examples of particulate materials include calcined kaolins under the trade designation Satintone® and siloxane treated calcined kaolins under the trade designation Translink® from Engelhard Corporation, Iselin, N.J.; calcium carbonate under the trade designations Atomite® and Supermite® from English China Clay and stearic acid treated ground calcium carbonates under the trade designations Supercoat® and Kotamite® from English China Clay.

The particulate materials suitable for use in the present invention are finely divided. The term finely divided when utilized herein means that the particulate materials have a median individual particle size (average diameter) below about 100 microns. In one embodiment, the particulate materials have a median individual particle size of about 10 microns or less. In another embodiment, the particulate materials have a median individual particle size of about 3 microns or less. In yet another embodiment, the particulate materials have a median individual particle size of about 1 microns or less.

Particle size and particle size distribution as used herein are measured with a Micromeritics Sedigraph 5100 Particle Size Analyzer. Measurements are recorded in deionized water for hydrophilic particles. Dispersions are prepared by weighing 4 grams of dry sample into a plastic beaker, adding dispersant and diluting to the 80 ml mark with deionized water. The slurries are then stirred and set in an ultrasonic bath for 290 seconds. Typically, for kaolin 0.5% tetrasodium pyrophosphate is used as a dispersant; with calcium carbonate 1.0% Calgon T is used. Typical densities for the various powders are programmed into the sedigraph, for example, 2.58 g/ml for kaolin. The sample cells are filled with the sample slurries and the X-rays are recorded and converted to particle size distribution curves by the Stokes equation. The median particle size is determined at the 50% level.

The particulate materials particularly suitable for use in this invention are inert and nontoxic. As used herein, inert particulate materials are particles that are not phytotoxic to horticultural crops and ornamental crops. The particulate materials are nontoxic meaning that, in the quantities needed for effective light blockage to mitigate freeze/chill damage, such materials are not considered harmful to animals, the environment, the applicator and the ultimate consumer, if any, of agricultural products made in connection with the present invention.

The present invention relates to plants wherein the surface of the plant is treated with one or more particulate materials. The particulate material treatment does not materially affect the exchange of gases on the surface of the plant. The gases which pass through the particle material treatment are those which are typically exchanged through the surface skin of living plants. Such gases typically include water vapor, carbon dioxide, oxygen, nitrogen and volatile organics.

The surface of the plant is treated with an amount of one or more particulate materials that is effective in enhancing light blockage of the plant. The particulate material treatment residue forms a film of one or more layers of particulate materials on the plant surface. The extent of treatment coverage of the plant is within the skill of the ordinary artesian. Less than full plant coverage is within the scope of the invention and can be highly effective, for example, neither the under surface of the plant (that which is not exposed directly to the source of water, such as dew) need not be treated by the method of this invention nor must the upper surface of the crop be completely covered; although full plant coverage can reduce the frequency of sites where high light levels can contact the plant. Moreover, in preparing for morning sunshine after an anticipated freeze/chill evening, a more thorough particulate material application can be made to the eastern side of the plant that receives a higher amount of solar radiation.

In one embodiment, the particulate materials are applied to a plant as a slurry of finely divided particles in a volatile liquid such as water, a low boiling organic solvent or low boiling organic solvent/water mixtures. One or more layers of this slurry can be sprayed or otherwise applied to the plant. Additives such as surfactants, dispersants, speaders/stickers (adhesives), low boiling organic liquids, salts, agrichemicals, and colored particles may be incorporated into the slurry of the particulate materials. The particulate materials when applied as a slurry are hydrophobic particulate materials or hydrophilic particulate materials.

In another embodiment, the particulate materials are applied to a plant as a dry dust. The resultant residue of this treatment may be hydrophilic or hydrophobic. The particulate materials when applied as a dry particles are hydrophobic particulate materials or hydrophilic particulate materials, but preferable hydrophobic particulate materials.

In yet another embodiment, the particulate materials are applied to a plant as an emulsion water, and a low boiling organic liquid. In this embodiment, the particulate materials are initially mixed with the low boiling organic liquid and then mixed with water to form a stable emulsion. Mixing of the particulate materials with the low boiling organic liquid can involve high shear mixing, in order to promote the formation of a stable emulsion afterwater is added. The particulate materials when applied as an emulsion are hydrophobic particulate materials or hydrophilic particulate materials, but preferable hydrophilic particulate materials.

Spreader/stickers that can be mixed with hydrophilic particles (for example, about 3% by weight or more solids in water) to aid in spraying uniform treatments on plants are: modified phthalic glycerlol alkyd resins such as Latron B-1956 from Rohm & Haas Co.; plant oil based materials (cocodithalymide) with emulsifiers such as Sea-wet from Salsbury lab, Inc.; polymeric terpenes such as Pinene II from Drexel Chemical Co.; nonionic detergents (ethoxylated tall oil fatty acids) such as Toximul 859 and Ninex MT-600 series from Stephan.

Stickers that can be mixed with hydrophobic and/or hydrophilic particles (such as about 1% or more solids in water, or about 3% or more solids in water) to aid in spraying uniform treatments on horticultural plants are: plant oil based materials such as cottonseed oil, and other commercial non-wetting stickers.

In another embodiment, agrichemicals are incorporated into the particle slurry or particle-plant mix. Examples of agrichemicals include nutrients, microbial agents, fertilizers, herbicides, pesticides, fungicides, insecticide, and the like.

In yet another embodiment, the particulate material film contains particles of various colors, so that when the particulate materials are applied to a plant, the spectrum of reflected light or heat exchange from the plant is altered. Such colored particles may be non-reflective. Examples include natural iron oxides such as yellow limonite, red hematite, brown limonite; black iron oxides such as Pigment Black 10; synthetic iron oxides such as copperas red and ferrite red; precipitated red iron oxide; brown iron oxides such as Pigment Brown 6 and brown ocher; synthetic black iron oxides such as Pigment Black 1 and synthetic magnetite; copper-black; chrome-black; zinc magnesium ferrite pigments such as Pigment Brown 11 and mapioc tans; carbon black pigments such as Pigment Black 6 or 7, furnace black, channel black, acetylene black, furnace black, bone black and lampblack; graphite including natural and synthetic graphites such as electrographite or artificial graphite; aniline black such as Pigment Black 1; logwood black lakes such as Natural Black 3, Lake, Logwood Pigment; and the like. Specific examples of colored particles include black particles, brown particles, green particles, red particles, yellow particles, and blue particles. In some instances, the colored particles facilitate the beneficial reflection of photosynthetic active radiation.

In one embodiment, the particulate material film formed on the surface of a plant contains particles where at least about 90% by weight of the particles have a median individual particle size (average diameter) below about 100 microns. In another embodiment, the particulate material film formed on the surface of a plant contains particles where at least about 90% by weight of the particles have a median individual particle size (average diameter) below about 10 microns. In yet another embodiment, the particulate material film formed on the surface of a plant contains particles where at least about 90% by weight of the particles have a median individual particle size (average diameter) below about 3 microns. In still yet another embodiment, the particulate material film formed on the surface of a plant contains particles where at least about 90% by weight of the particles have a median individual particle size (average diameter) below about 1 micron.

The low boiling organic liquids preferably include water-miscible and organic solvents. In one embodiment, the low boiling organic liquids contain from 1 to about 6 carbon atoms. The term low boiling as used herein means organic liquids which have a boiling point generally no higher than about 100° C. These liquids promote the ability of the particulate materials to remain in a finely divided state without significant agglomeration. Examples of low boiling organic liquids include alcohols such as methanol, ethanol, propanol, i-propanol, butanol, i-butanol, and the like, glycols (polyols), ketones such as acetone, methyl ethyl ketone and the like, and cyclic ethers such as ethylene oxide, propylene oxide and tetrahydrofuran. Combinations of the above-mentioned low boiling organic liquids, with or without water, can also be employed.

Low boiling organic liquids may be employed to facilitate applying the particulate materials by spraying to substrates. Typically, the low boiling organic liquids are used in an amount sufficient to facilitate the formation a dispersion of the particulate material. In one embodiment, the amount of low boiling organic liquid is up to about 30% (volume percent) of the dispersion. In another embodiment, the amount of low boiling organic liquid is from about 1% to about 20% (volume percent) of the dispersion. In yet another embodiment, the amount of low boiling organic liquid is from about 2% to about 10% (volume percent) of the dispersion. The particulate material is preferably added to a low boiling organic liquid to form a slurry and then this slurry is diluted with water to form an aqueous dispersion.

The particulate material treatment may be applied as one or more layers of finely divided particulate material. The amount of material applied is within the skill of one of ordinary skill in the art. The amount is sufficient to coat the plant surface and make the plant surface opaque to light. Typically, this treatment is most effective when the plant surface is white to black, white to gray, or gray to black in appearance. In one embodiment, from about 25 to about 5000 micrograms of particulate material/$cm^2$ of plant surface for particles having a specific density of around 1-4 $g/cm^3$ is applied to fully or partially coat the plant surface. In another embodiment, from about 50 to about 3000 micrograms of particulate material/cm$^2$ of plant surface for particles having a specific density of around 1-4 g/cm$^3$ is applied to fully or partially coat the plant surface. In yet another embodiment, from about 100 to about 500 micrograms of particulate material/cm$^2$ of plant surface for particles having a specific density of around 1-4 g/cm$^3$ is applied to fully or partially coat the plant surface.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

EXAMPLE 1

A suspension of calcium carbonate containing 0.5% surfactant MO3 and calcined kaolin containing 0.5% surfactant MO3 are applied to glass plates. Concentrations of 0.001% to 0.1% were applied to achieve a range of residues on the plates. Residue amounts are determined by weighing the plate with the residue and then removing the residue and re-weighing. Transmission of visible radiation (400-700 nm) through the residue is measured with a spectral radiometer. Transmission through an untreated glass plate is set at 100%. The results are reported in FIG. 1.

Increasing the residue decreased visible light transmission. Both materials had similar light blocking properties.

EXAMPLE 2

SURROUND® CF and SURROUND® WP (95% kaolin product from Engelhard Corp. Iselin, N.J.) were applied to Bartlett pear trees on 31 Mar. 2004 in a 6% suspension delivered in a volume equivalent to 100 gallons/acre. The trees were treated with an orchard sprayer. Four trees were treated for each treatment and 4 trees were left untreated. Flower counts were made on 31 Mar. 2004 to determine viability and 100% of flowers were viable. Two hundred fifty flowers/tree were evaluated by cutting the flowers longitudinally to examine the ovary. If the ovary was green, it was considered viable. If the ovary was brown or discolored, it was not viable. A frost (air temperature less than −1 C) occurred on the night of 31 Mar. 2004 and on Apr. 12, 2004 flowers were re-examined for viability. The untreated pear trees had 33.6% of the fruit buds damaged by the frost. The Surround CF and Surround WP treated trees had 16.2 and 21.1% of the fruit buds, respectively, damaged by the frost. The untreated pear trees had statistically higher (P<0.05) flower damage than either of the treatments (Surround CF and WP). The reduced damage was due to light blockage following the frost event.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of reducing chill damage in a plant, comprising the steps of:
    A) applying to plant surfaces a particulate material in an amount sufficient to form a particulate material film sufficient to block at least 20% of the solar radiation from reaching the plant surface having the film thereon, wherein the particulate material film comprises finely divided hydrophilic particulate material selected from calcium carbonate and hydrous kaolin, and the particulate material film allows for an exchange of gases on the plant;
    B) exposing the plant to a temperature below 15° C. to about 0° C. said temperature being low enough to cause chill damage in untreated plants, and
    C) exposing the plant surface having the film thereon to solar radiation, wherein the amount of solar radiation reaching the plant surface having the film thereon is sufficiently blocked so that plant having the film thereon exhibits less chill damage as compared to untreated plants undergoing similar exposure to the temperature followed by exposure to solar radiation.

2. The method of claim 1 wherein the particulate material consists essentially of calcium carbonate.

3. The method of claim 1 wherein the particulate material film prevents at least about 30% of at least one of ultraviolet, visible, and infrared solar radiation from contacting the plant.

4. The method of claim 1, wherein the particulate material film consists essentially of hydrous kaolin and the hydrous kaolin has an average particle by size of about 3 microns or less.

5. The method of claim 1 wherein the plant is one selected from the group consisting of apple trees, pear trees, peach trees, plum trees, lemon trees, grapefruit trees, avocado trees, orange trees, apricot trees, grape vines, and walnut trees.

6. The method of claim 1, wherein the particulate material film comprises hydrous kaolin and the particulate material has a median individual particle size of 1 microns or less.

7. The method of claim 1 wherein the plant is selected from pear trees.

8. The method of claim 1, wherein the particulate material film comprises calcium carbonate and the particulate material has a median individual particle size of 3 microns or less.

9. The method of claim 1, wherein the particulate material film further comprises a spreader/sticker or a sticker selected from modified phthalic glycerol alkyd resins, polymeric terpenes, ethoxylated tall oils, and plant oils.

10. The method of claim 1 wherein the particulate material film prevents at least about 20% of the visible portion of solar radiation from contacting the plant.

11. The method of claim 1 wherein the plant is selected from vegetables.

12. A method of preventing chill damage in a plant, comprising:
    preventing a substantial amount of solar radiation from contacting the plant after temperatures fall below about 15° C. by applying a particulate material film to the plant to block a substantial amount of the solar radiation, wherein the particulate material film comprises finely divided hydrophilic particulate material and the particulate material film allows for an exchange of gases on the plant; and
    exposing the plant having the particulate material film thereon to a temperature sufficient to cause chill damage in untreated plants and then to chill-damage-increasing solar radiation.

13. The method of claim 12 wherein the particulate material film comprises at least one particulate material selected from the group consisting of aluminum trihydrate, barites, calcined kaolin, calcium carbonate, precipitated calcium carbonate, calcium chloride, carbon black, chalk, clays, cryolite, diatomaceous earth, dolomite, feldspar, hydrous kaolin, metakaolin, iron oxide, hydrated lime, limestone, mica, talc, pyrophyllite, quartz, pyrogenic silica, silica, sand, and titanium dioxide.

14. The method of claim 12 wherein the particulate material film prevents at least about 20% of ultraviolet, visible, and infrared solar radiation from contacting the plant.

15. The method of claim 12 wherein the particulate material film consists essentially of hydrous kaolin and the hydrous kaolin has an average particle size by weight of about 10 microns or less.

16. The method of claim 12 wherein the plant is one selected from the group consisting of apple trees, pear trees, peach trees, plum trees, lemon trees, grapefruit trees, avocado trees, orange trees, apricot trees, grape vines and walnut trees.

17. The method of claim 12 wherein the particulate material film comprises kaolin and the kaolin has a median individual particle size of 1 micron or less.

18. The method of claim 12 wherein the particulate material film prevents at least about 20% of the visible portion of solar radiation from contacting the plant.

19. A method of preventing freeze damage in a plant, comprising:

applying a particulate material film to portions of the plant containing chloroplasts, said particulate material film being present in an amount sufficient to block at least about 30% of the solar radiation to reduce photochemical input into a photosynthetic system of the plant after temperatures fall below about 0° C., wherein the particulate material film comprises finely divided hydrophilic particulate material and the particulate material film allows for an exchange of gases on the plant; and exposing the plant having the particulate material film thereon to a temperature sufficient to cause freeze damage in untreated plants and then to solar radiation in an amount sufficient to increase the freeze damage.

20. The method of claim 19, wherein the particulate material film comprises at least one particulate material selected from the group consisting of aluminum trihydrate, barites, calcium carbonate, precipitated calcium carbonate, calcium chloride, carbon black, chalk, clays, cryollite, diatomaceous earth, dolomite, feldspar, and hydrous kaolin, metakaolin, iron oxide, hydrated lime, limestone, mica, talc, pyrophyllite, quartz, pyrogenic silica, silica, sand, and titanium dioxide.

21. The method of claim 19 wherein the plant is one selected from pear trees, and the film comprises 50 to 3000 micrograms of particulate material per square centimeter of treated plant surface.

22. The method of claim 19 wherein the plant is one selected from pear trees, and the film comprises 100 to 500 micrograms of particulate material per square centimeter of treated plant surface.

* * * * *